United States Patent [19]

Hage

[11] 4,154,139

[45] *May 15, 1979

[54] SCREW THREADED FASTENING MEANS AND LIKE PRODUCTS

[75] Inventor: Jacob M. Hage, Farmington, Mich.

[73] Assignee: M.C.P. Industries, Inc., Troy, Mich.

[*] Notice: The portion of the term of this patent subsequent to May 23, 1995 has been disclaimed.

[21] Appl. No.: 890,027

[22] Filed: Mar. 24, 1978

Related U.S. Application Data

[60] Division of Ser. No. 437,801, Feb. 1, 1974, Pat. No. 4,091,173, which is a continuation-in-part of Ser. No. 208,080, Dec. 15, 1971, abandoned.

[51] Int. Cl.² .................. B32B 15/18; F16B 32/00
[52] U.S. Cl. ............................... 85/41; 85/1 C; 428/657; 428/658; 428/667; 428/674; 428/675; 428/677; 428/679; 428/680; 428/935
[58] Field of Search ............ 85/41.1 C; 204/41; 428/656, 657, 658, 674, 675, 677, 679, 667, 680, 935

[56] References Cited

U.S. PATENT DOCUMENTS

| | | | |
|---|---|---|---|
| 1,651,278 | 11/1927 | Humphries | 428/666 |
| 1,835,636 | 12/1931 | Corbit | 428/667 |
| 1,835,637 | 12/1931 | Corbit | 428/657 |
| 1,931,704 | 10/1933 | Moore et al. | 428/635 |
| 3,247,082 | 4/1966 | DuRose | 428/934 |
| 3,249,409 | 5/1966 | McLeod | 428/657 |
| 3,884,116 | 5/1975 | Hage | 428/657 |

FOREIGN PATENT DOCUMENTS 811573  4/1959  United Kingdom ............. 85/1 C

*Primary Examiner*—Arthur J. Steiner
*Attorney, Agent, or Firm*—Harness, Dickey & Pierce

[57] ABSTRACT

A novel fastening means of a highly corrosion resistant nature and presenting a bright chrome-like outer appearance.

8 Claims, 3 Drawing Figures

4,154,139

SCREW THREADED FASTENING MEANS AND LIKE PRODUCTS

This application is a division of application Ser. No. 437,801 filed Feb. 1, 1974, now U.S. Pat. No. 4,091,173, issued May 23, 1978; which in turn is a continuation-in-part of application Ser. No. 208,080, filed Dec. 15, 1971, now abandoned. References cited in said patent and applications are incorporated herein by reference.

BACKGROUND OF THE INVENTION

This invention broadly relates to novel fastening means and like products. More specifically, this invention relates to a novel fastener means which is highly resistant to corrosion such that it is usable for example in exterior automotive vehicle applications and which fastener means generally present a bright chrome outer appearance; and, the method of making said fastener means and like products.

The state of the art is indicated by the following references which are cited here for the record: U.S. Pat. Nos. 3,532,609 Miyata et al; 2,603,593 Blickensderfer; 3,501,278 Uchida et al; 3,503,775 Austin; 1,878,837 Francis; 1,903,130 Phillips; 2,676,917 Hammond et al; 2,709,847 Ihrie et al; 2,865,348 Topelian; 2,856,333 Topelian; 2,950,234 Johnson et al; 3,317,411 Letendre; 2,824,830 Hausner; 3,414,483 Willingham; 3,428,441 Du Rose et al; 3,485,654 McGraw et al; 3,498,892 Scyb et al; 3,513,810 Jackson; McGraw Hill Encyclopedia of Science and Technology, Vol. 8, 1960, Page 280; "Electroplating" by J. B. Mohler et al, published 1951 by Chemical Publishing Co., Inc., Chapter 20 on Diffusion Coatings; Fisher Body Material Specification, No. 1-36, dated Aug. 5, 1971; and, Ford Motor Company Engineering Specification, entitled "Chromium Plated Carbon Steel Fasteners", dated May 25, 1970.

A main object of this invention is to provide an economical new fastener means which is highly corrosion resistant and which has an outer bright chrome appearance.

Another object of this invention is to provide a new and improved fastener means and a new method for use in the automotive field.

Another object of this invention is to provide a new fastener means for fastening various objects and for resisting corrosion and being capable of providing corrosion resistance measurements of at least 16 hours up to 22 hours and more in a standard CASS corrosion test (ASTM-B368-65), and at least about 96 hours and more in a salt spray corrosion test (ASTM-B-117), or at least about 96 hours and more in a simulated assembly-salt spray corrosion test.

Other objects, features, and advantages of the present invention will become apparent from the subsequent description and the appended claims taken in conjunction with the accompanying drawings.

SUMMARY OF THE INVENTION

Figure 1:
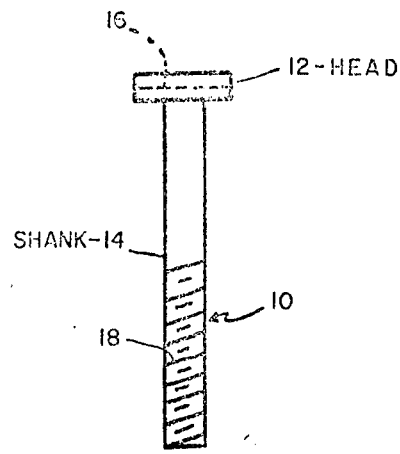
FIG. 1 illustrates one suitable fastener of a construction in accordance with the invention disclosed herein.

The product formed herein because it is economical to produce is believed to be the first of its kind for example usable in exterior automotive applications, while providing a highly corrosion resistant product with an outer shiny chrome appearance with the base metal being of an economical material such as carbon steel.

While it is not intended to base the theory underlying the invention discovered and disclosed herein on any particular theory of operation and while it is not fully understood why the invention provides the advantages or excellent results which have been obtained, it is believed that the new product discovered and disclosed herein derives its unexpected benefits from special layer material means which are applied to the base metal of the fastener to give very good corrosion resistance properties and good adhesion properties, while at the same time presenting an outer bright chrome finish. The invention is still being studied to obtain a better understanding of the operative causes which underly the discovery.

Briefly stated, in one aspect the present invention concerns a chrome plated carbon steel threaded fastener means for fastening objects in exterior as well as interior applications, such as in the automotive field and the like, and operative to provide high corrosion resistance properties to make the fastener means operative for outside applications which are exposed to the elements as compared to inside applications, comprising: a head portion at one end of the fastener means, and a shank portion, said fastener means having a structural makeup of separate layers including, (a) structural base metal means of carbon steel, (b) layer means of copper having a thickness between about 0.00001 and about 0.0001 inches, (c) layer means of cadmium having a thickness between about 0.00005 and about 0.0009 inches, (d) layer means of copper having a thickness between about 0.00001 and about 0.0005 inches, (e) layer means of nickel having a thickness between about 0.0001 and about 0.0007 inches, (f) layer means of chromium having a thickness between about 0.000005 and about 0.000020 inches, said layer means being for the most part applied by electrolytic coating process and being operative to enable high corrosion resistance properties.

In another aspect, the fastener means is subjected to heating, such as baking and the like, at a temperature between about 250° F. and about 900° F., for a time duration of about 1/12 to about 8 hours and longer, subsequent to application of layer (c) above.

In another aspect, the present invention concerns a highly corrosion resistant plated metal fastener means for fastening objects in exterior as well as interior applications, such as in the automotive field and the like, and operative to provide high corrosion resistance properties to make the fastener means operative for outside applications which are exposed to the elements as compared to inside applications, comprising: a head portion at one end of the fastener means, and a shank portion, said fastener means having a structural makeup of layers including (a) structural base metal means, (b) layer means of metal selected from at least one of the group consisting of copper, nickel, tin, cobalt, cadmium, and zinc having a thickness between about 0.00001 and about 0.0001 inches, (c) layer means of metal selected from at least one of the group consisting of cadmium, zinc, tin, cadmium-tin alloys, cadmium-zinc alloys, zinc-copper alloys, cadmium-copper alloys, and zinc-tin alloys, having a thickness between about 0.00005 and about 0.0009 inches, (d) layer means of copper having a thickness between about 0.00001 and about 0.0005 inches, (e) layer means of metal selected from at least one of the group consisting of nickel, cobalt, nickel-tin alloys, nickel-cobalt alloys, and cobalt-tin alloys, having a thickness between about 0.0001 and about 0.0007 inches, (f) layer means of chromium having a thickness between about 0.000005 and about 0.000020 inches, said layer means being for the most part applied by electrolytic coating process and being operative to enable high corrosion resistance properties.

In still another aspect, the present invention concerns a highly corrosion resistant plated metal fastener means for fastening objects in exterior as well as interior applications, such as in the automotive field and the like, and operative to provide high corrosion resistance properties to make the fastener means operative for outside applications which are exposed to the elements as compared to inside applications, comprising: a head portion at one end of the fastener means, and a shank portion, said fastener means having a structural makeup of layers including, (a) structural base metal means, (b) layer means of metal selected from at least one of the group consisting of copper, nickel, tin, cobalt, cadmium, and zinc having a thickness between about 0.00001 and about 0.0001 inches, (c) layer means of metal selected from at least one of the group consisting of cadmium, zinc, tin, cadmium-tin alloys, cadmium-zinc alloys, zinc-copper alloys, cadmium-copper alloys, and zinc-tin alloys, having a thickness between about 0.00005 and about 0.0009 inches, (d) layer means of copper having a thickness between about 0.00001 and about 0.0005 inches, (e) layer means of metal selected from at least one of the group consisting of nickel, cobalt, nickel-cobalt alloys, nickel-tin alloys and cobalt-tin alloys having a thickness between about 0.0001 and about 0.0007 inches, said layer means being for the most part applied by electrolytic coating process and being operative to enable high corrosion resistance properties.

From a method aspect, the present invention concerns a method of making a highly corrosion resistant fastening means comprising a head portion and a shank portion, comprised of the steps of: forming the head portion and shank portion from a base metal, coating the base metal of the fastener means with layer means of metal selected from at least one of the group consisting of copper, nickel, tin, cobalt, cadmium, and zinc having a thickness between about 0.00001 and about 0.0001 inches, applying a layer means of metal selected from at least one of the group consisting of cadmium, zinc, tin, cadmium-tin alloys, cadmium-zinc alloys, zinc-copper alloys, cadmium-copper alloys, and zinc-tin alloys, having a thickness between about 0.00005 and about 0.0009 inches, applying a layer means of copper having a thickness between about 0.00001 and about 0.0005 inches, applying a layer means of metal selected from at least one of the group consisting of nickel, cobalt, nickel-cobalt alloys, cobalt-tin alloys, and nickel-tin alloys, having a thickness between about 0.0001 and about 0.0007 inches, applying a layer means of chromium having a thickness between about 0.000005 and about 0.000020 inches, said layer means being for the most part applied by electrolytic coating process and being operative to enable high corrosion resistance properties.

In still another aspect, the present invention concerns a fastener means, such as one which is annular grooved, for fastening objects and for resisting corrosion and capable of providing a corrosion resistance measurement of at least 16 hours up to 22 hours and more in a standard CASS corrosion test, and at least about 96 hours and more in a salt spray corrosion test (ASTM-B-117), said fastener means including, a head portion, a shank portion, and having a structural makeup of: (a) structural base metal means, (b) layer means of metal selected from at least one of the group consisting of copper, nickel, tin, cadmium, cobalt, and zinc, (c) layer means of metal selected from at least one of the group consisting of cadmium, zinc, tin, cadmium-tin alloys, cadmium-zinc alloys, zinc-copper alloys, cadmium-copper alloys, and zinc-tin alloys, (d) layer means of copper, (e) layer means of metal selected from at least one of the group consisting of nickel, cobalt, nickel-cobalt alloys, cobalt-tin alloys, and nickel-tin alloys, and (f) layer means of chromium.

When the metal copper is used herein it is also intended to include a copper base alloy. By the term copper base alloy as used herein it is generally meant an alloy containing greater than about 55% copper, and preferably greater than about 65% copper.

The fastener means discovered and disclosed herein may also advantageously be made such that it is self tapping or such that it contains a tip portion which is self tapping for tapping an aperture which is receptive of the fastener means.

DESCRIPTION OF PREFERRED EMBODIMENTS

This description should be taken as illustrative only, and the description is made to describe the preferred embodiments of this invention.

FIG. 1 illustrates a fastener means designated 10 in accordance with the invention. The fastener means is comprised of a head portion 12 and a shank portion 14. The head 12 may suitably contain means such as the slot 16 for insertion of any suitable drive means such as a magnetic screw drive means or a normal screwdriver or the like. The fastener means 10 may suitably include annular groove means or threads designated 18.

Figure 2:
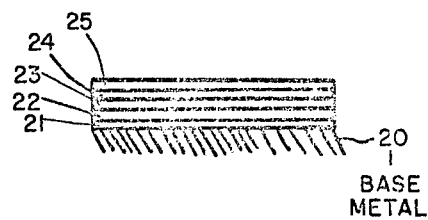
FIG. 2 illustrates an exploded view of a typical cross section of the surface construction of the fastener in FIG. 1 (with the cross section for example being taken on the fastener head midway between the recess and the edge of the head) showing the metal layer means structure of the fastener; and, FIG. 3, in partial cut-away form, illustrates another fastener embodiment in accordance with this invention wherein a self tapping end portion is included on the fastener.

FIG. 2 illustrates, in greatly enlarged detail, the structural makeup of the fastener means which has been discovered and disclosed herein. The makeup of the fastener means 10 includes a base metal, such as iron or carbon steel and the like, designated 20 and the base metal of the fastener has coatings formed thereover as follows. A first layer means of a preferred metal such as copper having a thickness between 0.00001 and about 0.0001 inches designated 21. A second layer means designates 22 preferably of cadmium and having a thickness between about 0.00005 and about 0.0009 inches. A third layer means designated 23 of a preferred material such as copper having a thickness between about 0.00001 and about 0.0005 inches. A fourth layer means designated 24 of a preferred material such as nickel having a thickness between about 0.0001 and about 0.0007 inches. A fifth layer means designated 25 of a preferred material such as chromium having a thickness between about 0.000005 and about 0.000020 inches. It is to be understood that the dimensions of the layer means 21-25 as shown in FIG. 2 are greatly exaggerated and that these layer means would actually be formed on the fastener means 10 in a uniform fashion such as would not disturb the general dimensions of the threads or annular groove means which are used on the fastener means 10.

Figure 3:
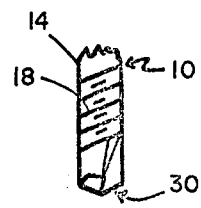

FIG. 3 illustrates a fastener means 10 similar to the fastener means of FIG. 1 except that in FIG. 3 the fastener means includes a self tapping means designated 30 at one end of the fastener means.

The head portion 12 of the fastener means 10 may use any suitable driving means for insertion of the fastener such as a transverse slot or recess for a screwdriver, or a Phillips type recess for driving by a Phillips type driver member. A magnetic drive means may be used for example in the utilization of a self tapping screw or fastener means in accordance with this invention. Numerous other types of driving or installing means may be used with the fastener means 10 of this invention depending on the particular construction of the inventive fastener means herein which is utilized.

The first layer means of copper referred to hereinabove may also suitably be a metal selected from at least one of the group consisting of copper, nickel, tin, cadmium, cobalt, and zinc. The thickness of this layer means may be on a preferred basis within the range of about 0.00002 to about 0.00008 inches.

The second layer means of cadmium referred to hereinabove may also suitably be a metal selected from at least one of the group consisting of cadmium, zinc, tin, cadmium-tin alloys, cadmium-zinc alloys, zinc-copper alloys, zinc-tin alloys, and cadmium-copper alloys. On a preferred basis this layer means should have a thickness within the range of about 0.0001 to about 0.0005 inches.

The third layer means of copper referred to hereinabove may preferably have a thickness within the range of about 0.00004 to about 0.00012 inches.

The fourth layer means of nickel may also suitably be a material selected from at least one of the group consisting of nickel, cobalt, nickel-cobalt alloys, cobalt-tin alloys, or nickel-tin alloys. Preferably this layer means may have a thickness within the range of about 0.0003 to about 0.0005 inches.

The fifth layer means of chromium may preferably have a thickness within the range of about 0.000005 to about 0.000012 inches. In the event that a nickel-tin alloy or cobalt-tin alloy is used for the fourth layer means then this fifth layer means of chromium may not be necessary and may be left off of the fastener means in certain circumstances while still obtaining a shiny chrome-like outer appearance for the fastener means 10.

It is also part of the discovery in accordance with this invention that the fastener means may be subjected to heating, such as baking and the like, at a temperature between about 250° F. and about 900° F. for a time duration of about 1/12 to about 8 hours and longer, subsequent to application of the layer means (c) referred to above, that is, the second layer means. This technique of subjecting to heating should be carried out preferably following the application of the layer means (c) or also it may be done subsequent to that time for example at the end of the application of the final coating layer means. This heating operation may be utilized to bring about some additional advantages in the final corrosion resistance properties of the fastener means described herein in that the heating would appear to assist in forming an especially tenaciously adherent highly corrosion resistant coating layer means on the fastener means.

On a preferred basis layer means (b) referred to above may be selected from at least one of the group consisting of copper and/or nickel. Layer means (c) may be, in certain preferred instances, selected from at least one of the group consisting of cadmium, tin, zinc, and alloys thereof. Best results in accordance with the discovery herein appear to be obtained when layer means (c) is selected from the group consisting of cadmium, tin, and alloys thereof.

While it has been discovered to be possible to apply the coating layer means referred to hereinabove in several different manners the best results to date appear to be obtained with the application of the layer means (b) for example of copper from a cyanide-copper electrolytic coating bath. Layer means (c) appears to be best applied from a cyanide-cadmium electrolytic coating bath. Layer means (d) appears to be best applied from a cyanide-copper strike electrolytic coating bath followed by a more efficient copper plating bath such as an acid-copper plating bath, or a cyanide-copper plating bath. Layer means (e) appears to be best applied from a bright acid-nickel electrolytic coating bath, and layer means (f) appears to be best applied from a chromic acid electrolytic coating bath.

With respect to the baking or heating operation described above it may be preferred in many instances to carry out the heating operation at a temperature of approximately 300° F. up to approximately 750° F. for a time period of approximately ¼ hour up to about 6 hours.

Examples of the heating or baking of the fastener means in accordance with this invention would be as follows. First, a plurality of 8–32×1 oval head tapping screws made of 1018–1022 carbon steel have a zinc layer means (or a tin or cadmium layer means) applied thereto from an electrolytic coating bath at a thickness of approximately 0.0001–0.0003 inches. At this point the fastener means with the zinc coating formed thereon is baked at 500° F. for approximately 2 hours. Then layer means (d), (e), and (f) are applied to finish the fastener means construction. It is to be noted in accordance with this kind of embodiment of the fastener means that layer means (b) and (c) may be the same and may be formed of the zinc deposited coating of the thickness referred to immediately above.

Second, the same general application as just referred to in the first example above may be followed in that an initial zinc coating may be applied with the subsequent application of layers (d), (e), and (f) as explained above and then the finished fastener means with the coatings applied thereto is baked at 500° F. for approximately 2½ hours.

Third, the fastener means has a zinc layer means applied thereto as described above, followed by a cadmium layer means as described above and then layer means (d), (e), and (f) are applied. This fastener means is then baked at 475° F. for approximately 3 hours.

Fourth, the fastener means has a zinc layer means applied thereto followed by a cadmium layer means applied thereto as described above; and, then layer means (d), (e), and (f) are applied as explained above and the fastener means is baked at 525° F. for approximately 2 ¾ hours.

Typical electrolytic baths which may satisfactorily be used for applying the layer means referred to above are as follows.

For layer means (b) of copper a cyanide-copper bath may be used of:

| | |
|---|---|
| copper (as metal) | 2 ozs. per gallon |
| sodium cyanide (free) | 1 oz. per gallon |
| sodium hydroxide | 1 oz. per gallon |

| | |
|---|---|
| balance | water |
| temperature | 120° F. |
| cathode current density (average) | 25 amps per square foot |
| barrel plating residence time | 5-10 minutes |

For a layer means of cadmium, the bath would be a cadmium electrolytic coating bath as follows:

| | |
|---|---|
| cadmium (as metal) | 2.7 ozs. per gallon |
| sodium cyanide (total) | 13.3 ozs per gallon |
| sodium hydroxide | 1.9 ozs. per gallon |
| balance | water |
| temperature | 75°-85° F. |
| cathode current density | 30 amps per square foot |
| barrel plating residence time | approximately 30 minutes |

For the application of layer means (d) of copper having a fairly high thickness, a cyanide-copper strike bath as above is utilized for 5-10 minutes followed by a more efficient acid or cyanide-copper plating bath for 5-15 minutes.

For the application of layer means of nickel, and electrolytic coating bath would be used as follows:

| | |
|---|---|
| hydrated nickel sulfate | 40 ozs. per gallon |
| hydrated nickel chloride | 8 ozs. per gallon |
| boric acid | 6 ozs. per gallon |
| brighteners | |
| McGean No. 230 | 1 pint per 100 gallons |
| McGean No. 233 | 4 gallons per 100 gallons |
| balance | water |
| pH | 4.0 |
| temperature | 145° F. |
| average current density | 45 amps per square foot |
| barrel plating residence time | 1 ½ hours |

For the layer means (f) of chromium, a chromium plating bath for electrolytic coating may satisfactorily be used as follows:

| | |
|---|---|
| $CrO_3$ | 36 ozs. per gallon |
| sulfuric acid | 0.32 ozs. per gallon |
| fluorides (optional) | |
| balance | water |
| temperature | 110° F. |
| residence time | approximately 4 minutes |
| average current density | 150 amps per square foot |

It should be understood that the above coating baths used to form the construction of the fastener means referred to herein are only typical baths and that other baths may be used. It should be understood that in certain instances various of the layer means which are referred to herein may be applied by electroless coating techniques. For example, if the copper layer means is applied electrolessly a catalytic electroless deposit could be used or, an immersion electroless copper layer means could be applied to a steel substrate and then the fastener means after that layer had been applied thereto could be finished with layer means (d), (e), and (f) referred to above. If the catalytic electroless deposit of copper were utilized then the fastener means could be finished off with the application of the layer means (c), (d), (e), and (f) as referred to above.

In accordance with the invention described herein it is preferred and best results appear to be obtained when the layer means (b), (c), (d), (e), or (f) as referred to above are formed by electrolytic coating process, however, it is also to be included as an aspect of this invention that these various layer means may also be formed by other coating techniques.

The advantages of this invention should be fairly apparent from the disclosure set forth above. However, it should also be clearly apparent that the fastener means discovered and disclosed herein is highly advantageous and believed to be commercially significant for the reason that the fastener means described herein possesses excellent corrosion resistance properties. The layer means construction of the new fastener discovered results in a fastener means which has a substrate with overlying layer means applied thereto which are tenaciously adherent to the fastener means such that the fastener means is highly useful in various fastener applications while at the same time the fastener means possesses excellent corrosion resistance properties making it very useful in commercial applications of numerous different types. It is believed that the fastener means discovered and disclosed herein is the first of its type and that it is particularly useful in the automotive field for exterior fastener applications, and also, the fastener means discovered and disclosed herein is very economical to produce. Moreover, viewed from an economic aspect, the fastener means discovered herein is considerably less expensive to produce and manufacture than are comparable chrome plated stainless steel fastener means.

It is to be understood that thicknesses referred to herein are normally measured on the fastener head midway between the slot or recess and the outer edge of the head, however, the thicknesses may also be measured on other suitable surfaces of the fastener means.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A highly corrosion resistant plated metal fastener means for fastening objects in exterior as well as interior applications, and operative to provide high corrosion resistance properties to make the fastener means operative for outside applications which are exposed to the elements as compared to inside applications,
   comprising:
   fastener means having a structural makeup of layers comprising, in sequence:
   structural base metal of steel,
   (b) layer of metal selected from at least one of the group consisting of copper, a copper base alloy, cobalt, and nickel,
   (c) layer of metal selected from at least one of the group consisting of zinc, tin, cadmium-tin alloys, cadmium-zinc alloys, cadmium-copper alloys and zinc-tin alloys,
   said layer (c) being a different metal than said layer (b),
   (d) layer of copper or a copper base alloy,
   (e) layer of metal selected from at least one of the group consisting of nickel, cobalt, nickel-cobalt alloys, cobalt-tin alloys, and nickel-tin alloys,
   (f) layer of chromium said layers being applied by electrolytic coating process and being operative to enable high corrosion resistance properties and good adhesion properties.

2. A metal plated product for corrosion resistant product uses, and having a structural makeup of layer comprising, in sequence:
   (a) a metal base substrate,
   (b) layer of metal selected from at least one of the group consisting of copper, or a copper base alloy,
   (c) layer of metal selected from at least one of the group consisting of cadmium-tin alloys, cadmium-zinc alloys, and cadmium-copper alloys,
   (d) layer of copper or a copper base alloy,
   (e) layer of metal selected from at least one of the group consisting of nickel, cobalt, or a nickel-cobalt alloy,
   (f) layer of chromium,
   said layers being applied by electrolytic coating process and being operative to enable high corrosion resistance properties and good adhesion properties.

3. The invention of claim 2, wherein, said substrate is carbon steel.

4. A corrosion resistant metal plated product having a structural makeup of layers comprising, in sequence:
   (a) a metal base substrate,
   (b) layer consisting essentially of copper,
   (c) layer consisting essentially of cadmium-copper alloy,
   (d) layer consisting essentially of copper,
   (e) layer consisting essentially of nickel,
   (f) layer consisting essentially of chromium,
   said layers being applied by electrolytic coating process and being operative to enable high corrosion resistance properties and good adhesion properties.

5. The invention of claim 4, wherein, said substrate is carbon steel.

6. A product means for corrosion resistant product uses, having a structural makeup of layers comprising, in sequence:
   (a) a metal base substrate,
   (b) layer of metal selected from at least one of the group consisting of copper, or a copper base alloy,
   (c) layer of metal selected from at least one of the group consisting of tin and cadmium-tin alloys,
   (d) layer of copper or a copper base alloy,
   (e) layer of metal selected from at least one of the group consisting of nickel, cobalt, or nickel-cobalt alloys,
   (f) layer of chromium,
   said layers being applied by electrolytic coating process and being operative to enable high corrosion resistance properties and good adhesion properties.

7. The invention of claims 2, 3, 4, 5 or 6 wherein, said product is a self drilling plated carbon steel fastener.

8. A highly corrosion resistant plated metal product means for exterior as well as interior applications, and operative to provide high corrosion resistance properties to make the product means operative for outside applications which are exposed to the elements as compared to inside applications,
   comprising:
   product means having a structural makeup of layers comprising, in sequence:
   (a) structural base metal of steel,
   (b) layer of metal selected from at least one of the group consisting of copper, a copper base alloy, cobalt, and nickel,
   (c) layer of metal selected from at least one of the group consisting of zinc, tin, cadmium-tin alloys, cadmium-zinc alloys, cadmium-copper alloys and zinc-tin alloys,
   said layer (c) being a different metal than said layer (b),
   (d) layer of copper or a copper base alloy,
   (e) layer of metal selected from at least one of the group consisting of nickel, cobalt, nickel-cobalt alloys, cobalt-tin alloys, and nickel-tin alloys,
   (f) layer of chromium
   said layers being applied by electrolytic coating process and being operative to enable high corrosion resistance properties and good adhesion properties.

* * * * *

UNITED STATES PATENT AND TRADEMARK OFFICE
CERTIFICATE OF CORRECTION

PATENT NO. : 4,154,139
DATED : May 15, 1979
INVENTOR(S) : Hage, Jacob M.

It is certified that error appears in the above-identified patent and that said Letters Patent are hereby corrected as shown below:

Column 1, line 25, "2,865,348" should be --2,855,348--.

Column 1, line 27, "3,414,483" should be --3,414,488--.

Column 3, line 7, "(c)" should be --(e)--.

Column 4, line 54, "designates" should be --designated--.

Column 5, line 11, "driver" should be --drive--.

Column 8, line 49, Claim 1, should be --(a)-- before statement "structural base metal...."

Column 9, line 2, Claim 2, "layer" should be --layers--.

Signed and Sealed this

Twenty-fifth Day of September 1979

[SEAL]

Attest:

Attesting Officer

LUTRELLE F. PARKER
*Acting Commissioner of Patents and Trademarks*